(12) United States Patent  
Chaudhry et al.

(10) Patent No.: US 12,430,916 B2
(45) Date of Patent: Sep. 30, 2025

(54) SAFETY COMPLIANCE SYSTEM AND METHOD

(71) Applicant: TARGET BRANDS, INC., Minneapolis, MN (US)

(72) Inventors: Asher Chaudhry, Minneapolis, MN (US); Arun Patil, Bangalore (IN); Venkatasubbarao Sadineni, Minneapolis, MN (US); Mahesh Ganapathiraman, Bangalore (IN); Craig Atkinson, Minneapolis, MN (US); Dharmavaram Arbaaz, Bangalore (IN)

(73) Assignee: TARGET BRANDS, INC., Minneapolis, MN (US)

( * ) Notice: Subject to any disclaimer, the term of this patent is extended or adjusted under 35 U.S.C. 154(b) by 141 days.

(21) Appl. No.: 17/579,029

(22) Filed: Jan. 19, 2022

(65) Prior Publication Data
US 2023/0230379 A1 Jul. 20, 2023

(51) Int. Cl.
*G06V 20/52* (2022.01)
*G06T 7/20* (2017.01)
*G06T 7/70* (2017.01)
*G06V 40/10* (2022.01)
(Continued)

(52) U.S. Cl.
CPC ............... *G06V 20/52* (2022.01); *G06T 7/20* (2013.01); *G06T 7/70* (2017.01); *G06V 40/10* (2022.01); *H04N 5/2628* (2013.01); *H04N 7/181* (2013.01); *G06T 2207/30196* (2013.01); *G06T 2207/30232* (2013.01)

(58) Field of Classification Search
CPC ...... G06V 20/52; G06V 40/10; G06V 10/757; G06V 20/10; G06V 2201/10; G06T 7/70; G06T 7/20; G06T 2207/30196; G06T 2207/30232; G06T 2207/30261; G06T 7/292; G06T 7/42; G06T 7/73; G06T 7/60; G06T 2207/10004; G06T 2207/10016; G06T 2207/30236; G06T 2207/30204; G06T 7/246; G06T 7/277; H04N 5/2628; H04N 7/181; H04N 7/18; H04N 7/188; F16P 3/142; G06Q 50/265; G01S 5/0294
USPC .................. 348/143, 159; 382/190, 291, 203
See application file for complete search history.

(56) References Cited

U.S. PATENT DOCUMENTS

| 7,659,835 B2* | 2/2010 | Jung | G06T 7/13 340/932.2 |
| 7,697,029 B2* | 4/2010 | Ozaki | H04N 7/181 348/148 |
| 8,666,117 B2 | 3/2014 | Bulan et al. | |

(Continued)

FOREIGN PATENT DOCUMENTS

KR 101049758 B1 7/2011

*Primary Examiner* — Christopher S Kelley
*Assistant Examiner* — Asmamaw G Tarko
(74) *Attorney, Agent, or Firm* — Dorsey & Whitney LLP

(57) ABSTRACT

A computer implemented method to detect compliance with safety requirements within a monitored environment. The method includes receiving at least one image of a monitored environment, analyzing the at least one image to detect one or more objects, analyzing the detected object and data corresponding to the monitored environment to determine that at least one characteristic of the object does not comply with a safety requirement, and generating a compliance record regarding the safety requirement.

19 Claims, 5 Drawing Sheets

(51) Int. Cl.
  *H04N 5/262* (2006.01)
  *H04N 7/18* (2006.01)

(56) References Cited

U.S. PATENT DOCUMENTS

| | | | | |
|---|---|---|---|---|
| 8,792,039 B2* | 7/2014 | Hirooka | G06T 5/80 | 348/333.03 |
| 8,854,469 B2* | 10/2014 | Horbinger | G06T 7/254 | 348/159 |
| 8,903,133 B2* | 12/2014 | Tsuchiya | G06T 7/246 | 382/104 |
| 9,008,361 B2* | 4/2015 | Gottschlag | G06V 20/52 | 348/169 |
| 9,695,981 B2 | 7/2017 | Au et al. | | |
| 10,102,431 B2* | 10/2018 | Allen | G06V 20/52 | |
| 10,397,544 B2 | 8/2019 | Tsuchiya et al. | | |
| 10,474,992 B2* | 11/2019 | Fisher | G06T 7/194 | |
| 10,973,441 B2* | 4/2021 | Tanaka | H04N 7/18 | |
| 11,501,453 B2* | 11/2022 | Boulio | G06V 20/52 | |
| 11,710,397 B2* | 7/2023 | Carey | G08B 31/00 | 348/143 |
| 2001/0019357 A1* | 9/2001 | Ito | G08B 13/19689 | 348/E7.086 |
| 2003/0035051 A1* | 2/2003 | Cho | G01S 3/7865 | 348/169 |
| 2004/0227816 A1* | 11/2004 | Sato | F16P 3/142 | 348/143 |
| 2007/0085901 A1* | 4/2007 | Yang | B60R 1/27 | 348/E7.086 |
| 2007/0229238 A1* | 10/2007 | Boyles | G06T 7/0008 | 348/148 |
| 2007/0237357 A1* | 10/2007 | Low | G01S 3/7864 | 382/103 |
| 2011/0018995 A1* | 1/2011 | Hazzani | G08B 13/19697 | 455/456.1 |
| 2011/0050878 A1* | 3/2011 | Wells | H04N 7/181 | 348/86 |
| 2011/0267460 A1* | 11/2011 | Wang | G06T 7/20 | 348/135 |
| 2012/0146789 A1* | 6/2012 | De Luca | G08B 21/24 | 382/103 |
| 2012/0307071 A1* | 12/2012 | Nishida | H04N 23/661 | 348/E7.085 |
| 2013/0117078 A1* | 5/2013 | Weik, III | G06Q 10/00 | 705/13 |
| 2013/0147961 A1* | 6/2013 | Gao | H04N 7/181 | 348/159 |
| 2013/0208124 A1* | 8/2013 | Boghossian | H04N 7/181 | 382/103 |
| 2013/0266185 A1* | 10/2013 | Bulan | G06V 10/25 | 382/104 |
| 2014/0184803 A1* | 7/2014 | Chu | G06T 7/292 | 348/159 |
| 2014/0300746 A1* | 10/2014 | Adachi | G06T 7/292 | 382/103 |
| 2014/0313330 A1* | 10/2014 | Carey | G08B 13/19613 | 348/143 |
| 2015/0103178 A1* | 4/2015 | Itoh | G06V 20/41 | 348/159 |
| 2015/0161449 A1* | 6/2015 | Armendariz | H04N 5/77 | 348/159 |
| 2015/0264320 A1* | 9/2015 | Yuki | H04N 7/181 | 348/159 |
| 2015/0287200 A1* | 10/2015 | Kokubun | G06T 7/20 | 348/143 |
| 2015/0288868 A1* | 10/2015 | Slavin | H04N 7/181 | 348/159 |
| 2016/0142680 A1* | 5/2016 | Tsunematsu | H04N 23/69 | 348/159 |
| 2016/0379074 A1* | 12/2016 | Nielsen | G01S 19/485 | 348/143 |
| 2017/0091563 A1* | 3/2017 | Chen | G06T 7/292 | |
| 2018/0101732 A1* | 4/2018 | Uchiyama | G06T 7/292 | |
| 2018/0324392 A1* | 11/2018 | Lee | G06Q 50/10 | |
| 2019/0007659 A1* | 1/2019 | Neubauer | G01B 11/14 | |
| 2019/0012766 A1* | 1/2019 | Yoshimi | G02B 27/64 | |
| 2019/0014239 A1* | 1/2019 | Zheng | H04N 5/147 | |
| 2019/0025853 A1* | 1/2019 | Julian | G06V 10/82 | |
| 2021/0012471 A1* | 1/2021 | Shin | G06T 7/60 | |
| 2021/0131821 A1* | 5/2021 | Wang | G01C 21/30 | |
| 2021/0132612 A1* | 5/2021 | Wang | G08G 1/096791 | |
| 2021/0166037 A1* | 6/2021 | Higa | G06T 7/254 | |
| 2021/0342586 A1* | 11/2021 | Fleisig | G06V 10/457 | |
| 2022/0058381 A1* | 2/2022 | Ionescu | G06V 10/25 | |
| 2022/0141425 A1* | 5/2022 | Johnson | G06T 7/292 | 348/159 |
| 2023/0095500 A1* | 3/2023 | Cheng | G06T 7/74 | 348/143 |
| 2023/0196895 A1* | 6/2023 | Lee | G06Q 10/105 | 340/573.1 |
| 2023/0230379 A1* | 7/2023 | Chaudhry | G06V 40/10 | 348/159 |
| 2023/0247181 A1* | 8/2023 | Hayashi | G06V 10/26 | 348/159 |
| 2023/0289035 A1* | 9/2023 | Garlick | G06F 3/0482 | |
| 2023/0410512 A1* | 12/2023 | Loke | G06T 7/246 | |

\* cited by examiner

SAFETY COMPLIANCE SYSTEM AND METHOD

FIELD

The described embodiments relate generally to systems and methods for video systems, such as those used in security or safety settings.

BACKGROUND

Industrial and high traffic areas, such as those surrounding a warehouse, shipping port, loading dock, distribution center, or the like, may be prone to accidents, such as collisions between humans and vehicles, vehicles with other vehicles and/or debris. Often, such environments may include safety requirements, such as speed limits, no-parking areas, driving routes, or the like, to help reduce accidents and injuries. However, compliance with such safety requirements is typically based on the honor system, i.e., no automated way to ensure compliance by various people within the environment. For example, some environments may include security cameras that capture video of a particular area, but such videos must be manually reviewed by security personnel in order to determine compliance. However, even if such reviews were done, they are delayed in time, which may reduce the effectiveness or possible mitigation of an accident or event, as well as are subject to human error and inaccuracies.

SUMMARY

In one embodiment, a computer implemented method is disclosed that includes receiving at least one image of a monitored environment, analyzing the at least one image to detect one or more objects, analyzing the detected object and data corresponding to the monitored environment to determine that at least one characteristic of the object does not comply with a safety requirement, and generating a compliance report regarding the safety requirement.

In another embodiment, a system is disclosed including a first camera and a computing device in electrical communication with the first camera. The first camera is positioned at a first location within a monitored environment and configured to capture a plurality of first images of the monitored environment from the first location. The computing device is configured to translate the plurality of first images to a ground perspective from a capture perspective, analyzing the translated plurality of images to determine that at least one characteristic of a detected object does not satisfy a safety a requirement, and generating a compliance record for the at least one characteristic of the detected object based on the determination that the at least one characteristic does not satisfy the safety requirement.

In yet another embodiment, a method is disclosed that includes receiving a first image of a monitored environment captured from a first perspective at a first point in time, receiving a second image of the monitored environment captured from the first perspective at a second point in time, receiving a third image of the monitored environment captured from a second perspective at the first point in time, receiving a fourth image of the monitored environment captured from the second perspective at the second point in time, analyzing the first image, the second image, the third image, and the fourth image to determine that at least one characteristic of an object within the monitored environment, based in part on the least one characteristic, determining that the object is not in compliance with a safety requirement, and generating a compliance record corresponding to the at least one characteristic.

DETAILED DESCRIPTION

The systems and methods described herein relate to identification and recordation of possible safety issues, such as non-compliance with safety requirements, within a monitored environment (e.g., parking lot, loading dock, warehouse, or other industrial or high traffic area). The system may include one or more cameras positioned at different locations within the monitored environment, which are configured to capture images at various points in time. The captured images may be converted from a captured point of view into a ground plane or birds eye plane. Utilizing the converted or mapped images, the system analyzes the images over a time period (e.g., series of two or more frames) to detect objects and determine various object characteristics (e.g., speed, direction, location, personal protective equipment configuration, cell phone or device usage within certain locations, risky user behavior, etc.). The object characteristics are compared to safety requirements and monitored environment information, such as location of safety zones, to assess compliance with safety requirements. In one example, the system may utilize a machine learned classifier that analyzes the images and monitored environment information to output predictions regarding safety compliance.

The system may generate a compliance record regarding non-compliance and/or generate user notifications (e.g., alerts) regarding the compliance record. In some instances, the system may be integrated within a security system, such as a set of cameras and environmental sensors used to generate authorized access alarms, to help increase safety and reduce possible dangerous incidents.

Figure 1:
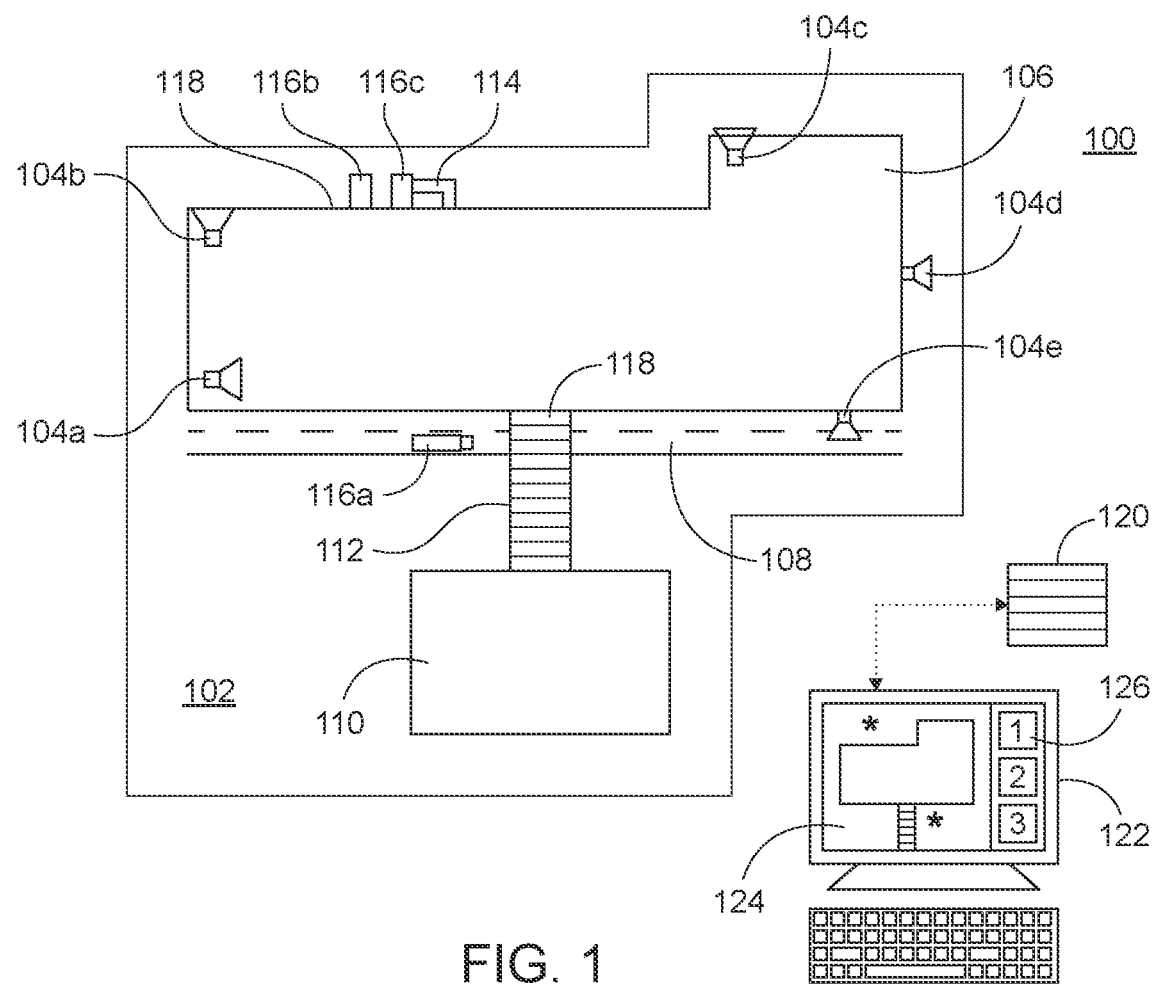
FIG. 1 illustrates a schematic view of a system for determining safety compliance within a monitored environment.
Figure 2:
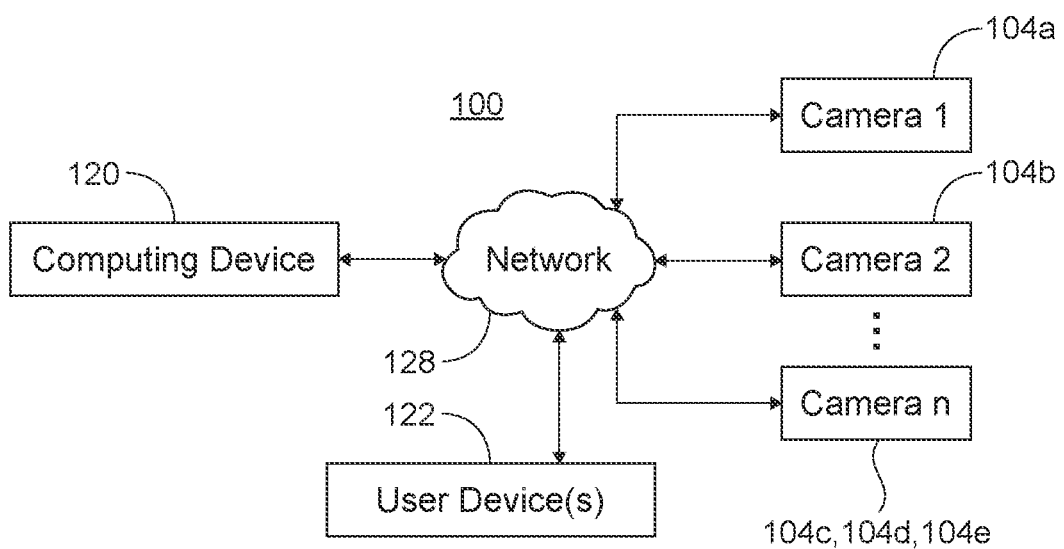
FIG. 2 illustrates a block diagram of select computing and electronic components of the system of FIG. 1.

FIG. 1 illustrates a schematic of a system 100 for monitoring safety requirements within an environment. FIG. 2 is a block diagram of various electronic components of the system 100 of FIG. 1. With reference to FIGS. 1 and 2, the system 100 may be configured to survey or capture information related to a monitored environment 102. The monitored environment 102 may be generally any type of high traffic or industrial location with safety requirements or regulations, such as, but not limited to, a workplace, a warehouse, a distribution center, shipping dock or shipping yard, parking lot, school, loading dock, or the like. In some instances, the monitored environment 102 or regulated environment may include one or more buildings 106, such as warehouses, offices, etc., that may include traffic areas, such as roads 108 or predefined driveways or paths for moving vehicles 116a, 116b, 116c, such as trucks, fork lifts, bicycles, or the like. The roads 108 may define permitted locations for the moving vehicles and may include applicable safety requirements, such as speed limits, direction restrictions (e.g., one way), and the like.

Similarly, the monitored environment 102 may further include designated parking zones or areas, such as one or more parking lots 110, as well as loading or docking bays 118, where various vehicles may be temporarily positioned, e.g., to load and unload goods or people. There may also be one or more safety zones 112, 114 or sensitivity zones that may have enhanced or different safety requirements. For example, the safety zones 112, 114 may be defined as pedestrian walkways, sidewalks, entrance/exit locations, and the like. The type and location of the safety zones 112, 114 may be varied based on the type of monitored environment 102. Further, the monitored environment 102 may include areas within a building or warehouse, where the safety zones 112, 114 may be determined as certain walkways or pathways through the building, e.g., defined areas for machines to move and defined areas for pedestrians within rows of items and other obstacles.

The system 100 may include one or more cameras 104a, 104b, 104c, 104d, 104e distributed at various positions (e.g., different location, elevations, and angles) with respect to the monitored environment 102. The cameras 104a, 104b, 104c, 104d, 104e may be integrated as part of a security system or may be standalone or separate devices that may communicate to one another and/or to a computing device 120 via a network 128. The cameras 104a, 104b, 104c, 104d, 104e may be configured to have overlapping field of views, such that substantially the entire area of the monitored environment 102 may be captured via images from the 104a, 104b, 104c, 104d, 104e. Additionally, the overlapping fields of view may allow better object tracking as objects, such as people, vehicles 116a, 116b, 116c, goods, and the like, move within the monitored environment 102. In some embodiments, the cameras 104a, 104b, 104c, 104d, 104e may be mounted along structures or free standing within the monitored environment 102, such as being mounted on the roof or along the top edge of the building 106. However, the placement and configuration of the cameras 104a, 104b, 104c, 104d, 104e may be varied based on specifics of the monitored environment 102.

With reference to FIG. 1, the system 100 may include one or more computing devices 120, which may include one or more servers, distributed cloud computing resources, personal computers, or a combination of one more of the same. The computing devices 120 may be configured to receive information from the cameras 104a, 104b, 104c, 104d, 104e, such as images and time stamp or frame information, and utilize the information to determine safety compliance for the monitored environment 102.

The system 100 may also include one or more user devices 122, which may be computing devices, such as smart phones, tablets, personal computers, or the like. As shown in FIG. 2, the user device 122 may be a personal computer that may include a user interface 124 that outputs compliance information to the user. In one example, the user interface 124 may include a representation (e.g., map, images, or video feeds) of the monitored environment 102 and reflect safety compliance information on the same, such as via indicators (e.g., icons representative of safety issues at the approximate location of the same) and/or a compliance record 126 of the safety issue. The compliance record 126 may be output to a user as a list or other graphical representation and include information, such as location, time, and type of compliance issues identified by the system 100. Additionally, alerts, such as notifications, emails, messages, or the like, may be transmitted to various distributed user devices 122, such as to people working or walking in the monitored environment 102 to help ensure mitigation of the safety issues identified.

In some embodiments, the user interface 124 may be combined with features for security systems, such as those that generate alarms based on unauthorized access or that are used to identify or mitigate theft of goods or vehicles. In these instances, the user interface 124 may include the compliance record 126 or compliance information overlaid or combined with the security information, or the compliance record 126 may be accessible separately from the security information. In other embodiments, the compliance record 126 or compliance information may be separate from the security information.

The various components of the system 100 may transmit information to and from each other via one or more networks 128. The network 128 type may be varied based on the architecture of the system 100, but in some embodiments may include one or more of a WiFi, Intranet, Bluetooth, ZigBee, or other radio wave based communication method. In other examples, wired networking, such as Ethernet, universal serial bus (USB), or other protocols may be used as well. For example, the cameras 104a, 104b, 104c, 104d, 104e may be hardwired to the computing device 120 or may transfer data to the computing device 120 via WiFi (e.g., to the cloud) and then computing device 120 may receive the information from the cloud.

The system 100 may act to monitor movement and positioning of people, vehicles, goods, and the like in the monitored environment 102 and compare object characteristics of the same, such as location information, speed or movement data, protective equipment configurations, time of day, and the like, against one or more safety requirements or regulations (e.g., safety zones, speed limits, directional requirements, personal protective equipment requirements, workplace safety requirements), to determine compliance with the same. In other words, the system 100 can detect possible safety issues due to breaches of the safety requirements.

Figure 3:
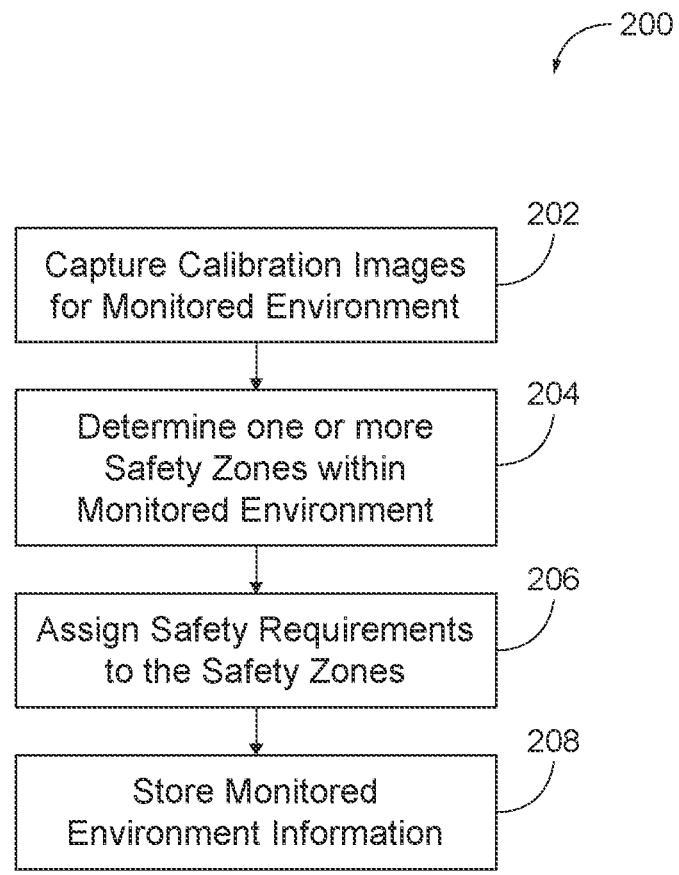
FIG. 3 illustrates a flow chart of a method to determine safety zones within the monitored environment.

FIG. 3 illustrates a method 200 to determine and correlate safety requirements within the monitored environment 102. The method 200 may begin with operation 202 and calibration images may be captured for the monitored environment 102. For example, the cameras 104a, 104b, 104c, 104d, 104e may be used to capture initial or calibration images of the monitored environment 102. The calibration images may be captured in a normal operating state of the monitored environment 102 (e.g., normal traffic and workflow) or may be captured during a calibration state (e.g., the traffic may be reduced or prevented). In many embodiments, the calibration images may be configured to include unobstructed features of the monitored environment 102, such as to be able to view safety zones 112, 114, roads 108, loading bays 118, shelving, racks, or the like, in the monitored environment 102.

In operation 204, the calibration images may be analyzed to determine the location or otherwise identify select features within the environment 102. For example, the calibration images may be analyzed to identify the safety zones 112, 114, roads, 108, and/or loading bays 118. The identified features may be tagged in the images such that these features can be used for safety compliance. In one embodiment, a user may evaluate the calibration images and identify boundaries in the images (e.g., identify select pixels) that correspond to the safety zones 112, 114. In another embodiment, computer vision algorithms or trained image classifiers may be used to automatically scan the images and identify the safety zones 112, 114 or other features via image recognition. For example, for a crossing walk, the computer vision algorithms may be used to identify the characteristic white parallel lines from other areas of the road 108 to identify the safety zone 112, 114 within the images. In yet other embodiments, the safety zones 112, 114 may be tagged with features, such as reflectors or the like, that may enhance the detectability of the zones 112, 114 by the computing device 120.

In operation 206, safety requirements may be correlated to the monitored environment 102. For example, safety requirements corresponding to the safety zones 112, 114 may be assigned to the identified locations within the calibration images. As some examples, a speed limit may be assigned to the roads 108, a no-vehicle parking requirement may be assigned to the safety zones 112, 114, a no-pedestrian area may be defined as locations outside of the safety zones 112, 114, a personal protective equipment (PPE) requirement may be defined as encompassing the entire outdoor area of the monitored environment 102, a behavior requirement may be defined as areas where certain behaviors or actions are considered risky (e.g., cellphone usage in driveways, unrestrained loading on upper shelves, or the like). It should be noted that the safety requirements may be assigned or correlated to specific locations within the monitored environment 102, e.g., safety zones, or may be applicable globally or across the entire monitored environment 102.

With continued reference to FIG. 3, in operation 208, the monitored information, which may include the tagged or identified features within the calibration images and the safety requirements, may be stored. For example, the monitored or system information may be stored in the computing device 120, such as in memory of the computing device 120.

Figure 4:
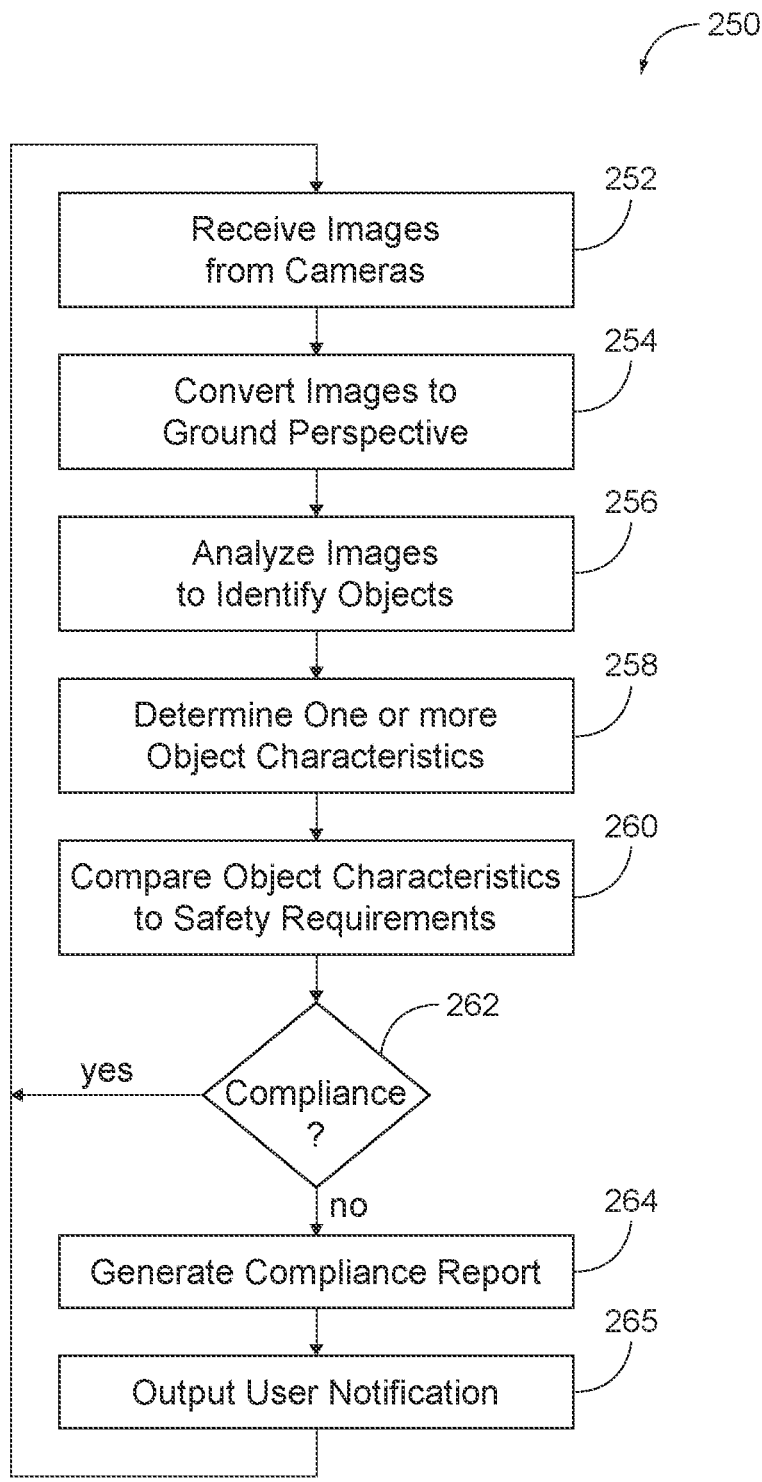
FIG. 4 illustrates a flow chart of a method to determine safety compliance within the monitored environment.

FIG. 4 illustrates a method 250 for utilizing the system 100 to assess compliance with safety requirements. The method 250 may include operation 252 and one or more images, may be received from one or more cameras 104a, 104b, 104c, 104d, 104e. In one example, the images may be captured at different points in time, e.g., different frames within a video stream of multiple images, and optionally may be captured from different locations or positions, e.g., a first image at a first point in time may be received from a first camera 104a, a second image at the first point in time may be received from a second camera 104b, a third image at a second point in time may be received from the first camera 104a, and a forth image at the second point in time may be received from the second camera 104b. In some instances, the field of views of the first and second cameras 104a, 1404b may overlap such that an object present in the first image may be present in the second image. In other instances, the field of views may not overlap. Similarly, in some instances, the first and second images may be captured at the same point in time or may be captured at different points in time.

It should be noted that the images may be received at the computing device 120 from the cameras 104a, 104b, 104c, 104d, 104e and may include time stamp or other frame information along with the pixel data (e.g., brightness, hue, etc.).

In operation 254, the one or more images may be converted from a captured perspective into a ground perspective. For example, the computing device 120 may analyze the images and may translate the images to allow more accurate object detection and tracking. As one example, homography may be used to vary the images to transform the image plane of the images, e.g., allow a linear mapping of the monitored environment to a pixel space representative of the monitored environment.

In one example, the ground perspective, which may be considered a "bird's eye view" may be utilized such that all features in the translated or mapped image may have the same distance, e.g., one pixel may correspond to the same physical distance for all objects in the image. As a specific implementation, the captured images may have a perspective where one pixel may represent a distance of one inch for one object in the captured image and four inches for another object in the image based on how close the objects may be to the camera and the angle of the camera when capturing the image. After translation, however, the distance for the two objects may be represented by the same ratio of pixels.

In some embodiments, the mapping may also correlate to identifying known objects, such as anchors or markers, and using those markers to determine a scale and/or position information for the image.

In operation 256, the translated or mapped images are analyzed to identify objects. For example, a computer vision algorithm or a trained model, such as a machine learned classifier or other machine learning model, may be used to identify objects, such as vehicles 116a, 116b, 116c and people, in the images.

In operation 258, object characteristics for detected objects may be determined. For example, the computing device 120 may determine object velocity based on a frame to frame comparison of the position of the object, see for example, the method 300 described in FIG. 5. Specifically, the object position in a first image at a first time may be compared to the position of the object in a second image at a second time, and because the images are mapped to a ground plane, the object velocity can be accurately determined. In unmapped images, the velocity may not be accurate as an accurate determination of distance traveled between the frames cannot be determined based on the different aspect ratios and horizon within the images. In one example, the mapped images are used to determine a pixel distance from the object to a known physical marker or other known feature and then translate the pixel distance into a physical distance, e.g., a distance in the monitored environment of the object relative to the physical marker. Then, in a subsequent frame, the updated distance of the object relative to the physical marker is determined and the velocity of the object is estimated based on a time period between the first frame and second frame and the change in the real world distance of the object over those frames. In this example, images from various locations in the monitored environment, which may be at different angles, orientations, fields of view or the like, all can be used together or separately to estimate object characteristic information within the monitored environment.

In other embodiments, however, the velocity may be estimated based on a change in pixel distance alone, i.e., not correlated to a physical distance, but in these implementations, if the images are captured from different cameras or locations, the images may need to be mapped to one another in order to make a more accurate estimate.

It should be noted that in some instances the object may travel across a variety of images captured by different cameras 104a, 104b, 104c, 104d, 104e, such as an object that moves around the monitored environment 102 into different camera field of views. In this case, multiple images from different cameras can be used to determine the object characteristics. In some embodiments, a Kalman filter, or the like, may be used to determine the object characteristics. In instances where a Kalman filter is used, the system 100 can generate predictions to help supplement the images, e.g., allow object characteristic estimations even in the event of occlusions, shadows, or missing frames.

As one example, the system may utilize the Kalman filter to predict a position of an object based on the object's location in one or more initial frames. Using the prediction, the system can estimate a position of the object in a next frame, so that the system can identify that the detected object in a subsequent frame is either the original object (as predicted) or is a second, new object. Further, the Kalman filter allows the system to continue with the determining object characteristics even if data is missing for one or more frames or for portions of a frame (e.g., an occlusion obscures a portion of the object). The Kalman filter may allow object detection algorithms to be simplified as the object detection in subsequent images may just be to confirm that the object is the one predicted or whether the object is a new object. If it is the object as predicted (already in being tracked), the system can proceed faster to compliance assessments, rather than requiring a full image analysis to determine what the object detected is, and then identify the object characteristics. In other words, the Kalman filter can expedite or enhance the analysis speed of the system by preventing multiple separate "tracks" of the same object as it moves within the monitored environment, and by reducing the sensitivity needed by the object detection algorithm in subsequent frames for a known or previously identified and tracked object.

As another example, the object characteristics may be determined using a trained model, such as a PPE configuration model. In this example, if the object is a person, the trained model may analyze characteristics of the image, e.g., pixel brightness, hue, location, etc. to determine whether the person is wearing PPE. For example, the pixel brightness may be evaluated by the model to determine that the person is wearing a bright and reflective PPE vest or may be used to determine that the person is wearing (or not wearing) a head protector, such as a helmet, or safety glasses. The type of PPE that may be analyzed may be based on the PPE used by an organization using the monitored environment 102 and may be varied accordingly. For example, a shipping or loading dock may have requirements on high visibility PPE and the model may be trained to identify the same, whereas a lab or processing plant may have requirements related to eye safety and the model may be trained to identify eye safety PPE.

In other examples, the system 100 may further evaluate personnel behavior. For example, the system may identify objects as one or more people within the monitored environment 102 and use this information to determine a pose of the person, such as by using a pose detector algorithm. The pose algorithm can generate estimates of a pose of the person by identifying links or coordinates, e.g., portions of the body, and a connection between the links or coordinates. The pose information can estimate whether a user is holding a device, such as a cellphone or smart phone, so as to look at the screen or to talk to the device. As another example, the pose detector can analyze a position across one or more frames to determine that an object corresponds to a person lifting an item.

With continued reference to FIG. 4, in operation 260, object characteristics may be compared to one or more safety requirements. For example, the detected object characteristics, e.g., speed, PPE configuration, location, and the like, may be compared against safety requirements regarding the identified object, whether that is a vehicle or a person. For a vehicle, the determined speed and type of vehicle may be compared to a stored safety requirement regarding the speed limit for the type of vehicle and location. As another vehicle example, the location of the vehicle may be compared against non-vehicle areas, such as safety zones 112, 114 and a time within the safety zone 112, 114 may be analyzed to determine if the vehicle complied with "no parking" within the safety zone 112, 114 or whether the vehicle improperly entered a safety zone 112, 114.

For a person, the detected object characteristics, such as the presence and configuration of PPE may be compared against the safety requirements for PPE configuration for the location of the person, e.g., within the ware house a first type of PPE configuration may be required as compared to outside of the warehouse. As another person example, the system 100 may be configured to determine whether the person stayed within predetermined walkways, such as safety zone 112, while in the monitored environment 102. In another example, the pose detection may identify that a person is looking at his or her phone or talking on his or her phone in an intersection, traffic area, or the like. Similarly, the system 100 may determine using a pose assessment that a person is unrestrained on a machine improperly, improperly lifting items, or otherwise not complying with safe warehouse or traffic area behavior requirements.

In operation 262, compliance with the safety requirement is determined. If the object is determined by the computing device 120 to be in compliance with or satisfy the safety requirement, the method 250 may return to operation 252 and continue to receive and analyze images from the cameras 104a, 104b, 104c, 104d, 104e. If, on the other hand, the object characteristics are determined to not be in compliance with the safety requirement, the method 250 may proceed to operation 264 and a compliance record 126 may be generated. For example, the compliance record 126 may indicate a possible safety issue or infraction and may include information corresponding to the object and object characteristics, e.g., time of day, location, and safety requirement violation. The safety requirements may be stored in a database and may include rules or other requirements as may be established by an organization. To safety requirements may be stored with tags indicating select object characteristics, such as location, speed, or the like. The system may then utilize an algorithm or machine learning model to analyze the safety requirements with the detected object characteristics.

In operation 265, the method 250 may optionally output a user notification in operation 265. For example, the user devices 122 may receive an alert, message, email, or the like, which may help to identify in-progress or current safety violations to people in the monitored environment 102 to help mitigate or remedy the violation. For example, the system 100 may send a notification to user device to alert of a vehicle parked improperly within a safety zone. As another example, the system 100 may send a notification to users including a reminder on PPE requirements based on identified compliance issues with PPE requirements.

Figure 5:
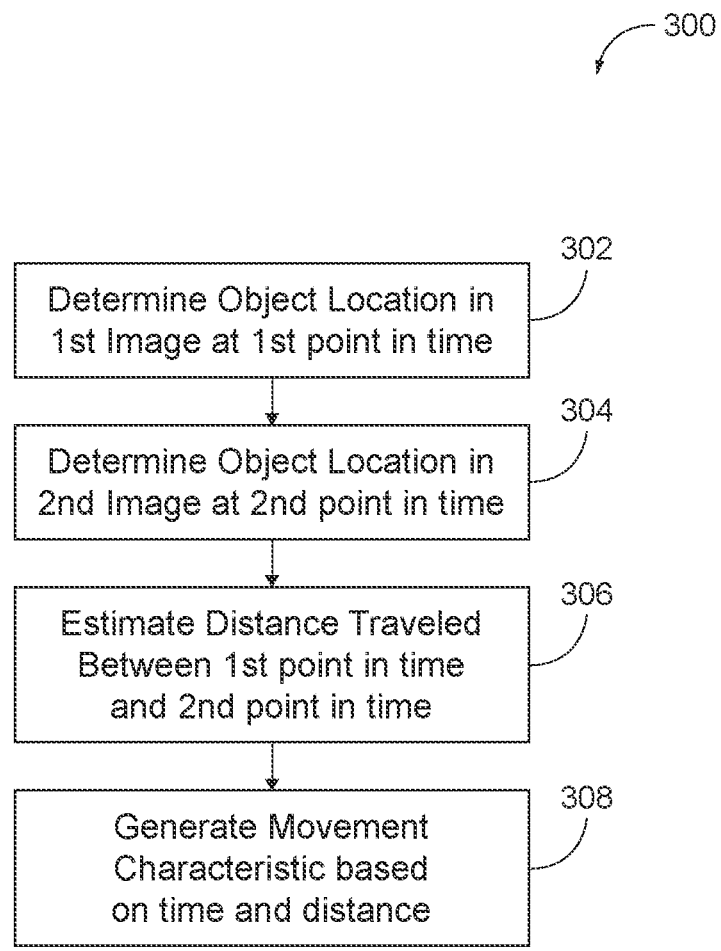
FIG. 5 illustrates a flow chart of a determining operation that may be utilized within the method of FIG. 4.

FIG. 5 illustrates a method 300 that may be used in operation 258 to determine object characteristics. With reference to FIG. 5, the method 300 may include determining an object location in a first image at a first point in time, e.g., at a first frame in a video. For example, the object detection features or computer vision algorithms can be used to locate a set of pixels that correspond to the object. In operation 304, the object location may be determined for a second image captured at a second point in time, e.g., a second frame or other subsequent frame within the video. As an example, a new location of the pixels corresponding to the object representation may be determined.

In operation 306, using the first pixels location, the second pixels location, and the time period or other data included with the images between the first and second images (e.g., time between frames), the distance between the first pixel location and the second pixel location can be determined. For example, the object pixels in the first image may be located on a first edge of the image and the object pixels in the second image may be located in a middle of the image and a distance, e.g., 5 to 10 pixels, may be determined as the movement or change of the pixels over time. In one instance, image subtraction or comparison of changes between image frames may be used to determine the changes or distance, which may increase the efficiency and speed in identifying the images as compared to a wholesale evaluation of each frame individually.

In operation 308, the movement characteristic may be determined or generated by based on the time between images and the distance. For example, the pixel distance may be converted to a physical distance, based the calibration images or know relationship between the translated or ground plane images and the monitored environment 102. The physical distance and change over the time period or frame interval may be calculated as a velocity or speed. As another example, the length of time for the object remaining in a particular location, such as a safety zone 112, 114 may be determined in a similar manner.

Figure 6:
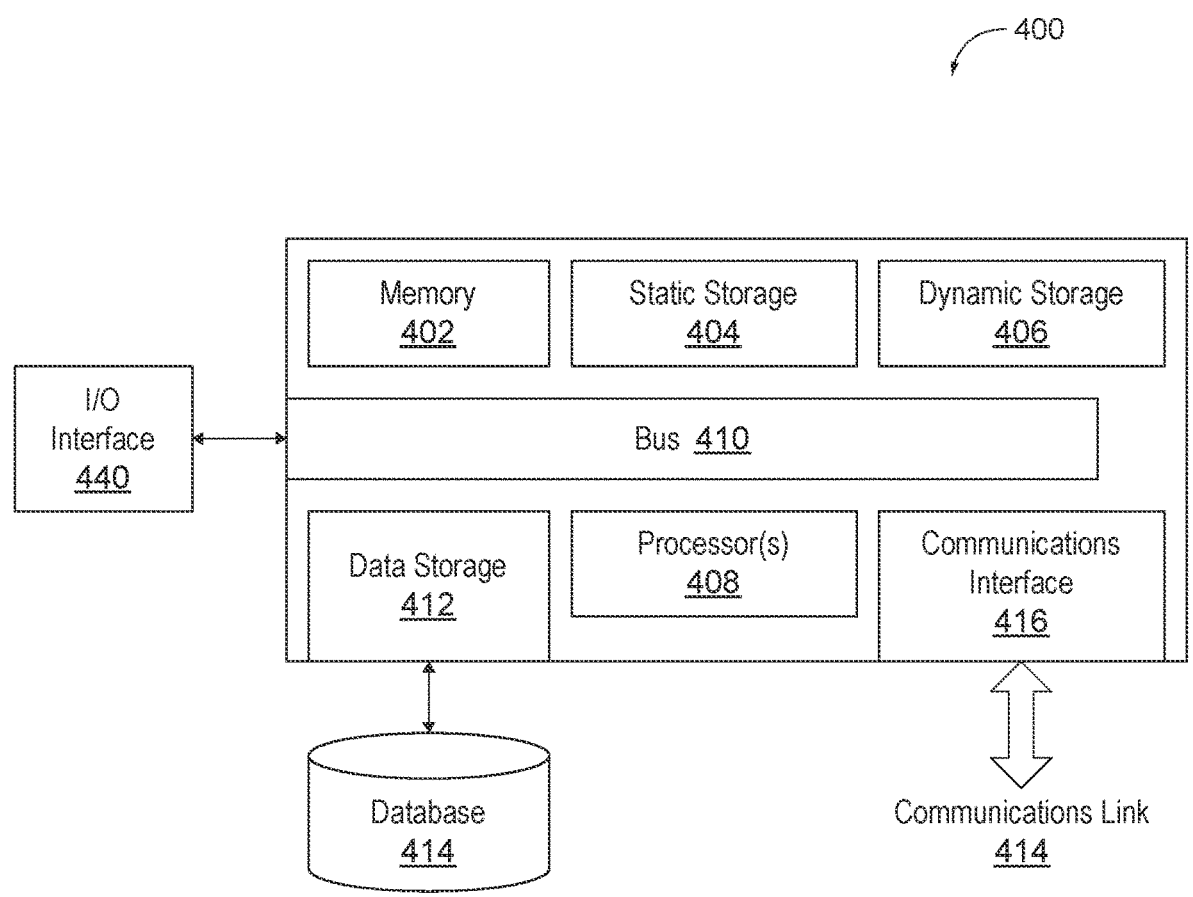
FIG. 6 illustrates a simplified view of a computing device for use with the system of FIG. 1.

The system 100 may be implemented using various computing systems. FIG. 6 illustrates a simplified block diagram of an example computing system 400 may be used for implementing various embodiments in the examples described herein. For example, the computing device 120 and user devices 122 may include or be implemented by the computing system 400. This disclosure contemplates any suitable number of computing systems 400. For example, the a computing system 400 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 400 may include one or more computing systems; be unitary or distributed; span multiple locations; span multiple locations; span multiple machines; span multiple data centers; or reside in a cloud, which may include one or more cloud components in one or more networks.

Computing system 400 includes one or more communication structures, such as a bus 410 (e.g., an address bus and a data bus) or other communication mechanism for communicating information, which interconnects subsystems and devices, such as processor 408, memory 402 (e.g., RAM), static storage 404 (e.g., ROM), dynamic storage 406 (e.g., magnetic or optical), communications interface 416 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 440 (e.g., keyboard, keypad, mouse, microphone). In particular embodiments, the computing system 400 may include one or more of any such components.

In particular embodiments, the processing element or processor 408 includes hardware for executing instructions, such as those making up a computer program. The processor 408 circuitry includes circuitry for performing various processing functions, such as executing specific software for perform specific calculations or tasks. In particular embodiments, I/O interface 440 includes hardware, software, or both, providing one or more interfaces for communication between computing system 400 and one or more I/O devices. Computing system 400 may include one or more of these I/O devices, where appropriate. One or more of these I/O devices may enable communication between a person and computing system 400.

In particular embodiments, communications interface 416 includes hardware, software, or both providing one or more interfaces for communication (such as, for example, packet-based communication) between computing system 400 and one or more other computer systems or one or more networks, e.g., network 128. One or more memory buses (which may each include an address bus and a data bus) may couple processor 408 to memory 402. Bus 410 may include one or more memory buses, as described below. In particular embodiments, one or more memory management units (MMUs) reside between processor 408 and memory 402 and facilitate accesses to memory 402 requested by processor 408. In particular embodiments, bus 410 includes hardware, software, or both coupling components of computing system 400 to each other.

According to particular embodiments, computing system 400 performs specific operations by processor 408 executing one or more sequences of one or more instructions contained in memory 402. For example, instructions for the user interface 124, compliance records 126, and instructions for the methods described herein may be contained in memory 402 and may be executed by the processor 408. Such instructions may be read into memory 402 from another computer readable/usable medium, such as static storage 404 or dynamic storage 406. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 408 for execution. Such a medium may take many forms, including but not limited to, nonvolatile media and volatile media. Non-volatile media includes, for example, optical or magnetic disks, such as static storage 404 or dynamic storage 406. Volatile media includes dynamic memory, such as memory 402.

Computing system 400 may transmit and receive messages, data, and instructions, including program, e.g., application code, through communications link 418 and communications interface 416. Received program code may be executed by processor 408 as it is received, and/or stored in static storage 404 or dynamic storage 406, or other storage for later execution. A database 414 may be used to store data accessible by the computing system 400 by way of data interface 412. In various examples, communications link 418 may communicate with, for example, the user devices 122, computing device 120, and/or cameras 104a, 104b, 104c, 104d, 104e.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of as defined in the claims. Although various embodiments have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements as defined in the following claims.

What is claimed is:

1. A computer implemented method comprising:
receiving a plurality of calibration images of a monitored environment;
identifying a feature to be used for safety compliance in the plurality of calibration images;
assigning a safety requirement to the feature;
receiving at least one image of a monitored environment, wherein the at least one image is received after the plurality of calibration images are received;
translating the at least one image from a first perspective corresponding to a first position of a camera capturing the at least one image to generate a translated perspective of the at least one image corresponding to a second position that is different from the first position of the camera, wherein the translating comprises mapping the at least one image to at least one mapped image comprising a pixel space representative of the monitored environment and a pixel in the at least one mapped image corresponds to a same physical distance for all objects in the at least one mapped image;
analyzing the at least one image to detect one or more objects;
analyzing the detected one or more objects and data corresponding to the monitored environment to determine that at least one characteristic of an object of the one or more objects does not comply with the safety requirement; and
generating a compliance record regarding the safety requirement.

2. The computer implemented method of claim 1, wherein the translated perspective is configured to allow a linear mapping of the at least one image to the at least one mapped image comprising the pixel space representative of the monitored environment.

3. The computer implemented method of claim 1, wherein the at least one mapped image converts the first perspective to a ground plane.

4. The computer implemented method of claim 3, further comprising determining a speed of the object based on a location relative to the ground plane in the first image and a location relative to the ground plane in the second image and a frame interval between the first image and the second image.

5. The computer implemented method of claim 1, wherein the monitored environment corresponds to a warehouse, a shipping yard, a parking lot, or a loading dock.

6. The computer implemented method of claim 1, wherein the safety requirement comprises a speed limit, a personal protective equipment configuration, a cellphone usage requirement, or a safety zone.

7. The computer implemented method of claim 1, further comprising:
determining that the object comprises a person; and
the at least one characteristic comprises a configuration of personal protective equipment on the person or a pose of the person.

8. The computer implemented method of claim 1, wherein the data corresponding to the monitored environment comprises a safety zone and the at least one characteristic of the object comprises a position of the object with respect to the safety zone.

9. The computer implemented method of claim 1, further comprising transmitting a compliance notification to a user device based on the compliance record.

10. The computer implemented method of claim 1, wherein the camera is positioned within the monitored environment.

11. A system comprising:
a first camera positioned at a first location within a monitored environment and configured to capture a plurality of calibration images of the monitored environment and a plurality of first images of the monitored environment from the first location, wherein the plurality of first images are captured after the plurality of calibration images; and
a computing device in electrical communication with the first camera and configured to:
receive the plurality of calibration images;
identify a feature to be used for safety compliance in the plurality of calibration images;
assign a safety requirement to the feature;
translate the plurality of first images to a ground perspective from a capture perspective, the translating comprising mapping the plurality of first images to a plurality of mapped images, each mapped image comprising a pixel space representative of the monitored environment, wherein a pixel in the plurality of mapped images corresponds to a same physical distance for all objects in the mapped image;
analyze the plurality of mapped images to determine that at least one characteristic of a detected object does not satisfy the safety requirement; and
generate a compliance record for the at least one characteristic of the detected object based on the determination that the at least one characteristic does not satisfy the safety requirement.

12. The system of claim 11, wherein the computing device is further configured to determine a position and a velocity of the detected object within a time period.

13. The system of claim 11, wherein the at least one characteristic comprises a position or a pose of the object within the safety zone.

14. The system of claim 11, wherein the at least one characteristic comprises a presence of personal protective equipment on the object.

15. The system of claim 11, wherein the computing device is further configured to transmit a user notification regarding the compliance record to a user device.

16. The system of claim 11, wherein one pixel in the plurality of first images represents a first physical distance and another pixel in the plurality of images represents a second physical distance that differs from the first physical distance.

17. A method comprising:
receiving one or more calibration images of the monitored environment prior to receiving one or more images of the monitored environment;
identifying a feature to be used for safety compliance in the one or more calibration images;
assigning a safety requirement to the feature;
receiving a first image of a monitored environment captured from a first perspective corresponding to a first position of a first camera at a first point in time;
receiving a second image of the monitored environment captured from the first perspective at a second point in time;
receiving a third image of the monitored environment captured from a second perspective at the first point in time;
receiving a fourth image of the monitored environment captured from the second perspective at the second point in time;
transforming an image plane of the first image to a ground perspective by linearly mapping the first image to a first mapped image that comprises a pixel space representative of the monitored environment, wherein a pixel in the first mapped image corresponds to a same physical distance for all objects in the first mapped image;
transforming an image plane of the second image to the ground perspective by linearly mapping the second image to a second mapped image that comprises the pixel space representative of the monitored environment, wherein a pixel in the second mapped image corresponds to the same physical distance for all objects in the first mapped image;
transforming an image plane of the third image to the ground perspective by linearly mapping the third image to a third mapped image that comprises the pixel space representative of the monitored environment, wherein a pixel in the third mapped image corresponds to the same physical distance for all objects in the first mapped image;
transforming an image plane of the fourth image to the ground perspective by linearly mapping the fourth image to a fourth mapped image that comprises the pixel space representative of the monitored environment, wherein a pixel in the fourth mapped image corresponds to the same physical distance for all objects in the first mapped image;
analyzing the first mapped image, the second mapped image, the third mapped image, and the fourth mapped image to determine at least one characteristic of an object within the monitored environment, the object associated with the feature;
based in part on the at least one characteristic and the safety requirement assigned to the feature, determining that the object is not in compliance with the safety requirement; and
generating a compliance record corresponding to the at least one characteristic.

18. The method of claim 17, further comprising:
generating a user interface that is configured to present the mapped image and the compliance record.

19. The method of claim 17, wherein the feature comprises a safety zone, a road, or a loading bay.

* * * * *